United States Patent
Bruehl

(10) Patent No.: US 6,168,144 B1
(45) Date of Patent: Jan. 2, 2001

(54) HYDRAULICALLY DAMPING ELASTOMER BEARING

(75) Inventor: Herbert Bruehl, Waldstetten (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/214,305

(22) PCT Filed: Jun. 26, 1997

(86) PCT No.: PCT/EP97/03352

§ 371 Date: Sep. 3, 1999

§ 102(e) Date: Sep. 3, 1999

(87) PCT Pub. No.: WO98/00654

PCT Pub. Date: Jan. 8, 1998

(30) Foreign Application Priority Data

Jul. 2, 1996 (DE) .............................................. 196 26 535

(51) Int. Cl.[7] ........................................................ F16F 5/00
(52) U.S. Cl. .................................. 267/140.11; 267/141.2; 267/140.12
(58) Field of Search .............................. 188/73.44, 73.32, 188/73.41, 73.42, 73.31, 73.45; 277/587, 636, 637; 267/140.11, 140.12, 141.2, 293

(56) References Cited

U.S. PATENT DOCUMENTS

| | | | |
|---|---|---|---|
| 4,838,529 | * 6/1989 | Orikawa et al. | 267/140.12 |
| 4,861,004 | 8/1989 | Yokota et al. | |
| 6,007,060 | * 12/1999 | Vermaerke | 267/140.12 |

FOREIGN PATENT DOCUMENTS

| | | |
|---|---|---|
| 37 31 004 A1 | 3/1988 | (DE) . |
| 40 10 922 A1 | 10/1990 | (DE) . |
| 41 03 012 C1 | 5/1992 | (DE) . |
| 43 07 559 A1 | 9/1994 | (DE) . |
| 0 577 916 A1 | 1/1994 | (EP) . |
| 0 656 487 A1 | 6/1995 | (EP) . |
| 2 622 661 | 5/1989 | (FR) . |
| 2 291 691 | 1/1996 | (GB) . |
| 61-197834 | 2/1985 | (JP) . |

* cited by examiner

Primary Examiner—Douglas C. Butler
Assistant Examiner—Melanie Talavera
(74) Attorney, Agent, or Firm—Evenson, McKeown, Edwards & Lenahan, P.L.L.C.

(57) ABSTRACT

A hydraulically damping elastomer bearing comprises an outer bearing sleeve as well as an elastomer element arranged therein and a bearing core which is held by the elastomer element. Between the bearing core and the bearing sleeve chambers are formed and filled with fluid, which chambers are interconnected via at least one channel. In order to achieve progressive damping characteristics in the impact region, between the bearing core and the inside wall of the bearing sleeve there is arranged in at least one of the chambers an inflexible, hydraulically supported displacement element. In the unloaded state, this displacement element is at a predetermined distance from a reference surface. Between the displacement element and a component bearing the latter there is formed a displacement chamber of small height between the displacement surfaces, the displacement chamber being in communication with one of the further chambers via at least one throttling orifice.

24 Claims, 3 Drawing Sheets

HYDRAULICALLY DAMPING ELASTOMER BEARING

This application claims the priority of German application No. 196 26 535.5 and PCT/EP97/03352, filed Jul. 2, 1996 and Jun. 26, 1997, respectively, the disclosures of which are expressly incorporated by reference herein.

BACKGROUND OF THE INVENTION

The present invention relates to a hydraulically damping elastomer bearing having an outer bearing sleeve, an elastomer element arranged therein, and a bearing core which is held by the said elastomer element and extends axially parallel or coaxially through the bearing sleeve, with chambers formed between the bearing core and the bearing sleeve and filled with fluid.

Hydraulically damping elastomer bearings are being increasingly used in vehicle construction. In the vehicle chassis area in particular, there is a demand not only for frequency-selective damping at very small vibration amplitudes but also increasingly for a greater damping of individual shocks, as occur for example when driving over potholes and transverse joints.

DE 43 07 559 A1 describes a flexible bearing bush which comprises an outer cylindrical bearing sleeve and an inner part held inside by a horizontally extending elastomer element. For the additional damping of vibrations of great amplitudes, impact absorbers which are moulded onto the elastomer element and also consist of the same material are provided. Fluid-filled chambers interconnected via channels are formed between the elastomer element and the outer bearing sleeve. In the known arrangement, between the bearing core and the moulded-on impact absorber, a cavity extends parallel to the longitudinal axis of the bearing core and is open towards the outside, so that when there are vibrations of great amplitude both the impact-absorbing distance between the bearing bush and the impact absorber and the distance formed by the cavity have to be overcome before progressive damping commences. How damping proceeds thereafter depends on the material properties of the elastomer and consequently cannot be determined exactly. What is more, dirt can get into the open cavity and adversely affect the damping characteristics by keeping the distance constant.

The present invention is based on the object of providing a hydraulically damping elastomer bearing in such a way that, for damping vibration amplitudes which go beyond a precisely definable deflection magnitude, a damping with specific progressive damping characteristics takes place.

This object is achieved by a hydraulically damping elastomer bearing between the bearing core and the inside wall of the bearing sleeve there is arranged in at least one of the chambers a substantially inflexible, hydraulically supported displacement element, which in the unloaded state is at a predetermined distance from a reference surface and between the displacement element and a component bearing the latter there is formed a displacement chamber of small height between the displacement surfaces, which chamber is in communication with one of the further chambers via at least one throttling orifice.

To be regarded as the major advantages of the elastomer bearing according to the invention are that, when there are vibrations of an amplitude which exceeds a certain magnitude, an exactly determinable progressive damping takes place, since the displacement element itself is inflexible and the damping produced by the hydraulic support of the displacement element can be set very exactly by the cross section of the throttling orifice. Depending on the configuration of the displacement element, very flat arrangements which take up only little installation space can be realized, without influencing the damping characteristics themselves.

It is regarded as an advantageous development of the present invention that the displacement element is arranged on the bearing core and the reference surface is formed on the inside wall of the bearing sleeve. In this case, depending on the design conditions and the likely directions of loading, a plurality of displacement elements may be provided, it being regarded as particularly expedient for there to be two displacement elements which lie on a common transverse axis of the bearing core and are consequently arranged diametrically.

According to a preferred embodiment, on the bearing core there is provided a hollow with a conical surface, in which a conical lateral surface of the displacement element is located, and the displacement chamber is formed between these surfaces. Such a configuration achieves the effect that the conical seating permits a self-centering of the displacement element, so that the damping function is ensured even if force is introduced eccentrically. It is also advantageous that the conical surface of the hollow and the conical lateral surface of the displacement element have different angles with respect to a plane orthogonal to the axis of symmetry, the angle of the conical surface of the hollow being greater than the angle of the conical lateral surface of the displacement element. In this way the effect is achieved that on the outer edge of the displacement chamber there is a smaller distance between the displacement element and the bearing core than towards the center of the displacement chamber, so that an annular gap acting as a throttling orifice is formed between these parts on the peripheral edge of the displacement chamber. This annular gap is increasingly reduced as the vibration amplitude takes effect, so that the damping force increases and, finally, the peripheral edge of the displacement element bears against the conical surface of the hollow.

The angle of the conical surface should, wherever possible, be <40° and is preferably about 30°. It has proven to be particularly suitable for the difference between the angles of the conical surface and the conical lateral surface to be between 1° and 5°, preferably about 2°.

To produce a further-increasing progressive damping after a first phase of the damping operation, it is advantageous to arrange an elastomeric layer between the damping element and the component bearing the latter. In this case, the surface of the displacement chamber lying opposite the displacement element is preferably formed on an elastomer coating. This elastomeric layer makes it possible for the displacement element to be moved further into the hollow once the annular gap has closed, the peripheral edge of the displacement element pressing into the elastomeric layer. In order that fluid can continue to flow out of the displacement chamber into the further chamber in spite of the closed annular gap, at the upper edge of the hollow there is provided at least one radial clearance, through which the displacement chamber is in communication with one of the further chambers. It is of course possible here for two radial clearances to be arranged diametrically.

In a preferred way, the distance between the displacement surfaces is dimensioned such that the maximum travel of the displacement element is about 1 mm. In this case, a great damping can be produced over a short distance. Depending on the design deflection, that is to say depending on the required damping forces for a specific application for the elastomer bearing, the displacement surface acted upon can be correspondingly dimensioned. For automotive engineering applications, it is regarded as advantageous for the displacement area acted upon to be >200 mm² and preferably between 300 mm² and 500 mm².

To keep the displacement element in a defined position when the bearing is not subjected to any loading, it is advantageous for a cylindrical depression with an elastomer layer provided at least partially on its cylinder wall to be arranged centrally in the hollow. A rotationally symmetrical continuation, which protrudes into the depression, is moulded onto the displacement element. In this case, the elastomer layer has a radially inwardly directed bead, which engages in a radial groove in the continuation. In order that no self-contained cushion of hydraulic fluid can be produced within the depression, it is also advantageous to arrange in the elastomer layer extending along the cylinder wall at least one channel which extends approximately from the bottom of the cylinder space into the displacement chamber. In order that no undetermined conditions with respect to the introduction of force to the displacement element occur, it is advantageous to create punctiform contact as far as possible between the displacement element and the inner lateral surface of the bearing sleeve. For this reason, it is proposed that the region of the displacement element located outside the hollow is configured as a spherical segment, the radius of the spherical segment preferably being at most 0.6 times the radius of the bearing sleeve.

The bearing core is preferably configured as a sleeve, on the lateral surface of which portions of greater wall thickness are formed, in which the hollow is respectively arranged. Provided between the chambers filled with fluid, which serve for damping vibrations of small amplitude, there is at least one throttling channel, by which the chambers fluidically communicate. Two bypass channels expediently extend between the chambers, operatively parallel to the throttling channel, a non-return valve being arranged in each of these channels. These non-return valves are configured in such a way that they open in different directions of flow, to be precise when there is a specific pressure level or difference in pressure between the two chambers. These non-return valves are formed in a particularly simple way by sealing lips of the elastomer element bearing against the inside wall of the bearing sleeve.

BRIEF DESCRIPTION OF THE DRAWINGS

These and further objects, features and advantages of the present invention will become more apparent from the following detailed description of a currently preferred embodiments when taken in conjunction with the accompanying drawings wherein.

DETAILED DESCRIPTION OF THE DRAWINGS

Figure 1:
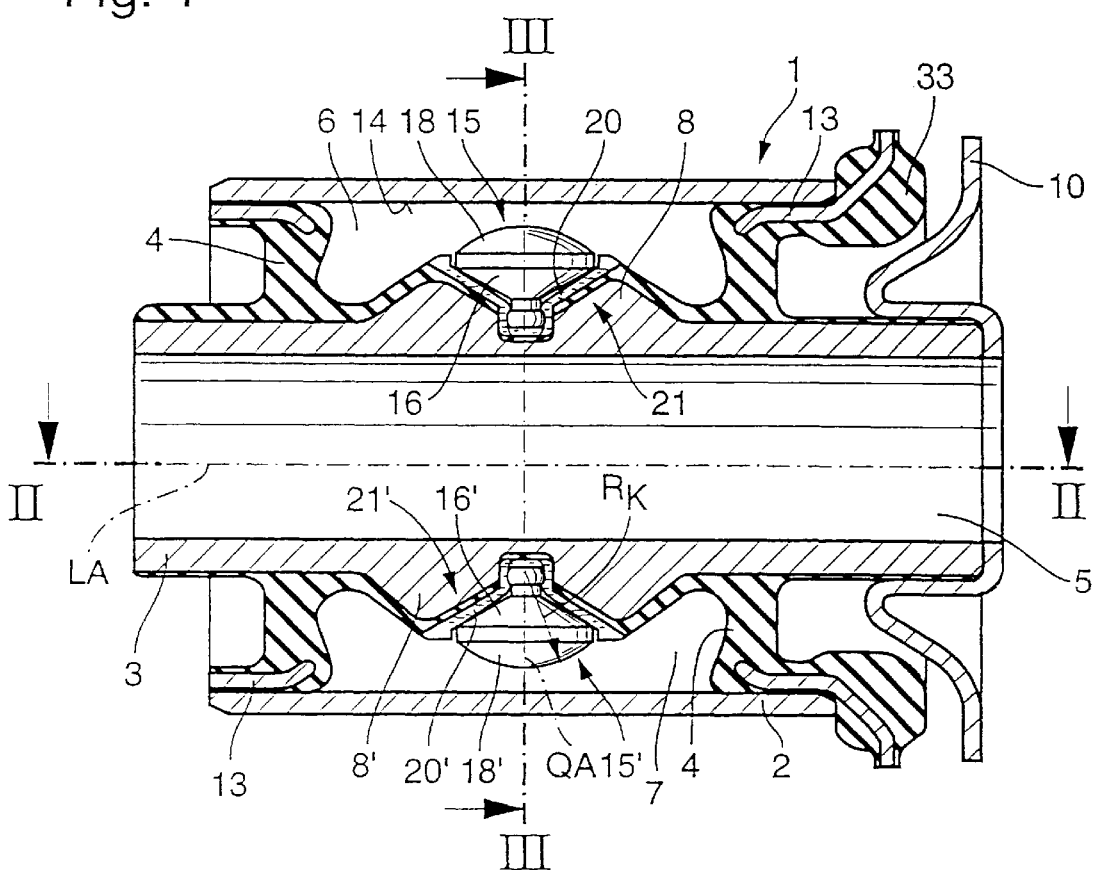
FIG. 1 is a longitudinal section view through a hydraulically damping elastomer bearing.

In FIG. 1 there is shown a longitudinal section through an elastomer bearing 1, which is designed rotationally symmetrically about a longitudinal axis LA. The elastomer bearing 1 substantially comprises a bearing sleeve 2 a bearing core 3 and an elastomer element 4 arranged between the bearing sleeve 2 and the bearing core 3. The elastomer element 4 is connected in a sealing manner both to the bearing sleeve 2 and to the bearing core 3, for example by vulcanization, fluid-filled chambers 6, 7 being formed between the bearing core 3 and the bearing sleeve 2. In the elastomer element 4 there is a shaped part 13, which preferably consists of a metal sheet, increasing the dimensional rigidity of the elastomer element 4 at certain locations. The bearing core 3 is a sleeve and has a central opening 5 for receiving a fastening bolt.

On the right-hand side in FIG. 1, the elastomer element has a bead 33, which is formed in front of the end face of the bearing sleeve 2, lies at a certain distance from a sheet-metal ring 10 fastened on the end face of the bearing core 3 and serves the purpose of damping vibrations of corresponding amplitude acting on the elastomer bearing 1 in the longitudinal direction of the axis LA. The bearing core 3 has two portions 8, 8' of greater wall thickness, in which a hollow 21, 21' is respectively provided in the form of a conical opening. In this conical hollow 21, 21' there is respectively a displacement element 15, 15', the region of which located within the hollow 21, 21' is a truncated cone 16, 16'. The region of the displacement element 15, 15' rising up above the hollow 21, 31' is a spherical segment 18, 18', the radius of the related sphere being denoted by $R_K$.

The two displacement elements 15, 15' lie on a common transverse axis QA of the elastomer bearing 1 and therefore, like the hollows 21, 21' in the portions 8, 8' of greater wall thickness, are arranged diametrically. The spherical segments 18, 18' are arranged at a certain distance from the inside wall 14 of the bearing sleeve 2, so that the inside wall 14 serves as a reference surface for the displacement elements 15, 15' when the bearing is deflected in the direction of the transverse axis QA. A displacement chamber 20, 20' is respectively formed between the truncated cone 16, 16' and the hollow 21, 21', with the distance of the surfaces forming the displacement chambers 20, 20' from the hollow 21, 21' and the truncated cone 16, 16' being small.

Figure 2:
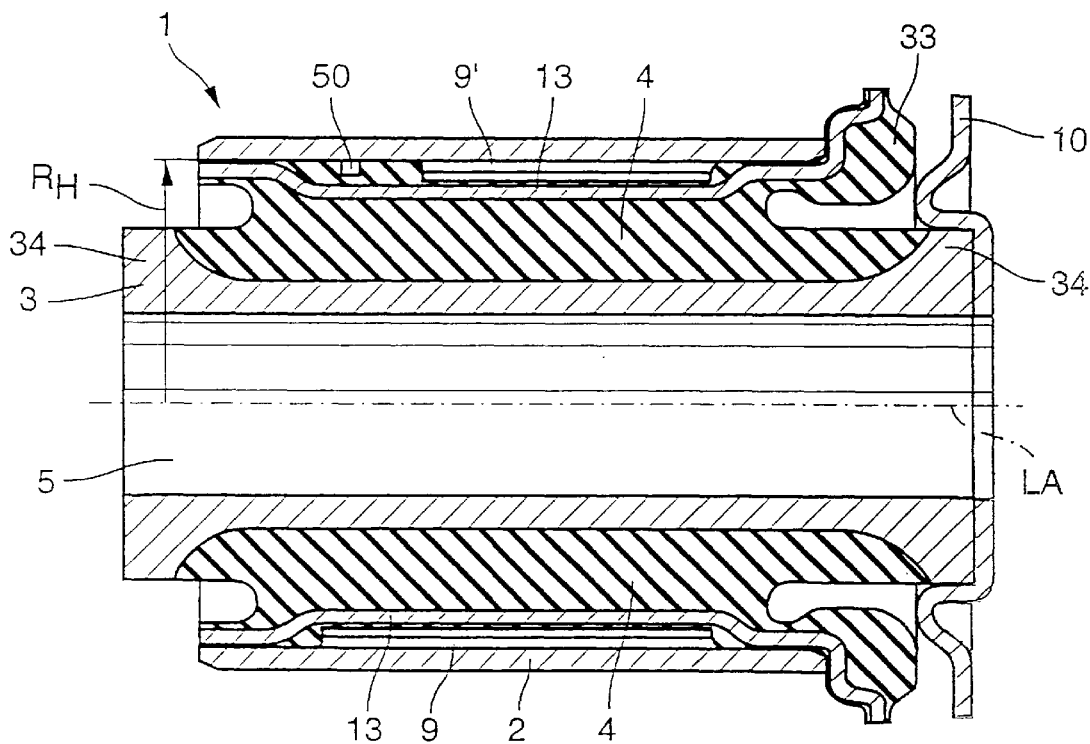
FIG. 2 is a section along line II—II in FIG. 1.

FIG. 2 shows a section along the line II—II in FIG. 1. It is clear from this representation that the bearing core 3 has radial projections 34 at its ends and is fastened on the lateral surface of the bearing core 3 in the axial intermediate space between the projections 34 of the elastomer elements 4. The shaping of the bearing core 3 with the radial projections 34 produces a positive connection in the axial direction. Provided within the elastomer element 4, or on its lateral surface, there is a throttling channel 50, by which the chambers 6 and 7 of FIG. 1 fluidically communicate. In the central region—with respect to the longitudinal direction of the elastomer bearing 1—the shaped part 13 extends at a small distance from the bearing sleeve 2, so that a channel 9 and 9' is respectively formed between the shaped part 13 and the bearing sleeve 2, these channels 9, 9' being intended as bypass channels with respect to the throttling channel 50. By way of valve apparatus, explained in more detail later, the bypass channels 9, 9' are closed under normal pressures and are opened only when there are certain differences in pressure. The inside radius of the bearing sleeve 2 is denoted by $R_H$, the ratio of the sleeve radius and the radius of the sphere preferably being $R_H:R_K=1:0.6$.

Figure 3:
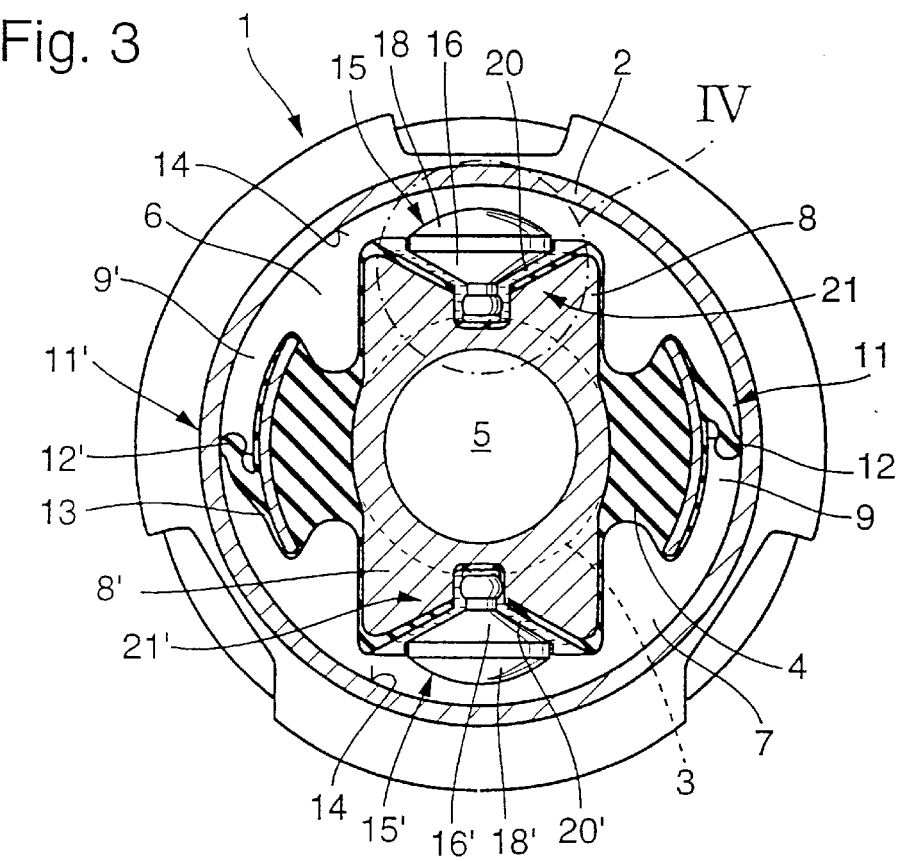
FIG. 3 is a radial section view along line III—III in FIG. 1.

In FIG. 3, a section along the line III—III in FIG. 1 is shown. The shape of the bearing core 3 in the region of the hollows 21, 21' receiving the displacement elements 15, 15' can be seen from this representation. In the central region, the elastomer element 4 extends only laterally of the bearing core 3, between the lateral surface of the latter and the shaped part 13, which in turn is at a distance from the inside wall 14 of the bearing sleeve 2, by which the bypass channels 9 and 9' are formed.

A sealing lip 12, 12', moulded onto the elastomer element 4, respectively extends in the bypass channel 9, 9' up to the inside wall of the bearing sleeve 2 and bears against the latter. These sealing lips 12, 12' form a non-return valve 11, 11' in each of the bypass channels 9, 9', with the valves 11, 11' opening when there is a pressure gradient in different directions. If vibrations acting on the elastomer bearing 1 cause a pressure gradient from the chamber 6 to the chamber 7, the difference in pressure occurring between the chambers 6 and 7 is reduced with a delayed effect via the throttling channel 50 and thus the vibration is damped. Only in cases of extreme vibration amplitudes and consequently a great difference in pressure between the chambers 6 and 7 does the sealing lip 12 lift off from the inside wall 14 of the bearing sleeve 2, whereby the non-return valve 11 opens, so that a quicker pressure equalization can take place through the channel 9. In the case of a corresponding pressure gradient between the chamber 7 and the chamber 6, this pressure equalization is brought about by the non-return valve 11' located in the channel 9'. The remaining reference numerals of FIG. 3 correspond to those of FIGS. 1 and 2, so that reference is made to the relevant description of the preceding figures.

Figure 4:
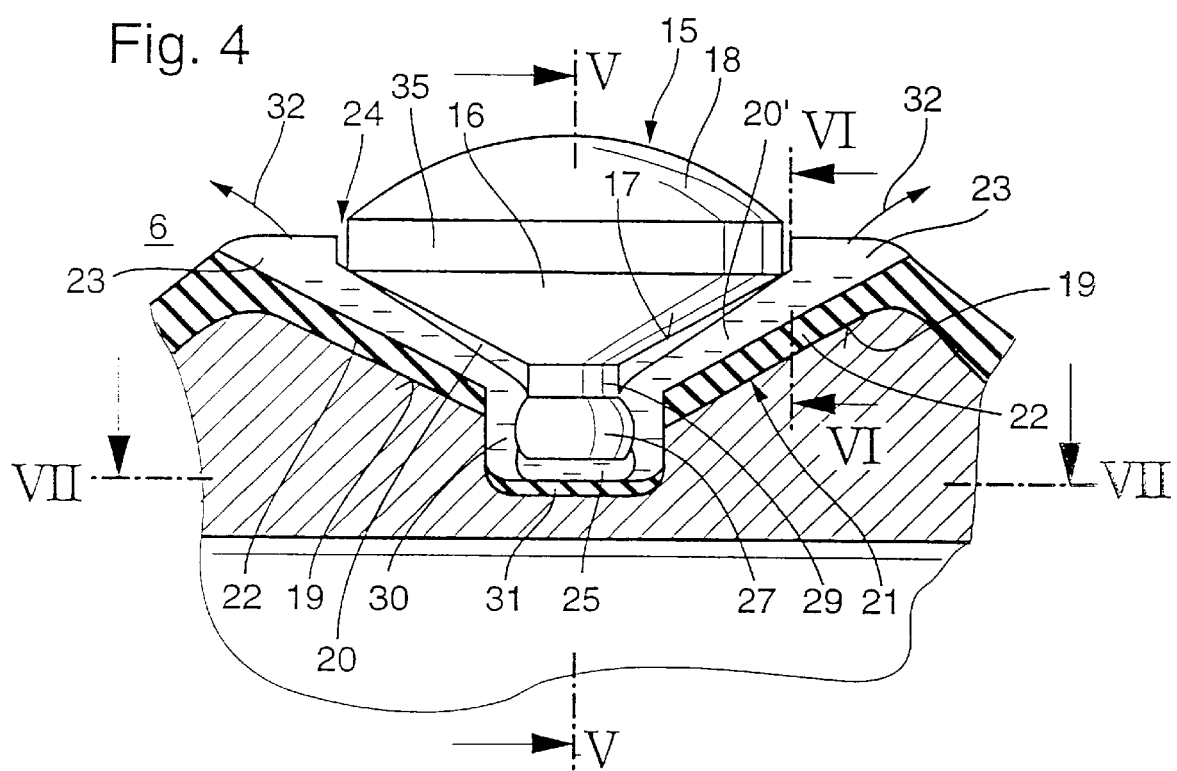
FIG. 4 is an enlarged view of detail IV in FIG. 3.

FIG. 4 shows an enlarged representation of the detail IV in FIG. 3. This representation makes it clear that a gap which extends up to the peripheral edge of the displacement element 15 is formed between the truncated cone 16 of the displacement element 15 and the hollow 21. On a conical surface 19 of the hollow 21 there is an elastomer coating 22. The displacement space 20 is formed by the distance between the conical lateral surface 17 of the truncated cone 16 and the surface of the elastomer coating 22 as well as two conduits 20' lying diametrically opposite, the conduits 20' extending beyond the radial limitation of the truncated cone 16. The displacement element 15, has between the truncated cone 16 and the spherical segment 18, a cylindrical portion 35, the lateral surface of which lies in a cylindrical portion of the hollow 21. An annular gap 24 between the cylindrical portion 35 and the hollow 21 forms a throttling orifice, so that fluid can escape from the displacement chamber 20 in a throttled manner through the annular gap 24. Also provided, on the upper edge of the hollow 21, are orthogonally arranged radial clearances 23, through which the fluid can likewise flow out of the displacement chamber 20, in the direction of the arrows 32, into the chamber 6.

Arranged in the hollow 21 is a cylindrical depression 25, into which there protrudes a rotationally symmetrical continuation 27 moulded onto the truncated cone 16. The continuation 27 is at a distance from the bottom 21 of the depression 25, channels 30 being formed on the lateral regions of the depression 25 and connecting the volume beneath the projections 27 to the displacement chamber 20. In its region directly adjoining the truncated cone 16, the continuation 27 has a peripheral groove 29.

Figure 5:
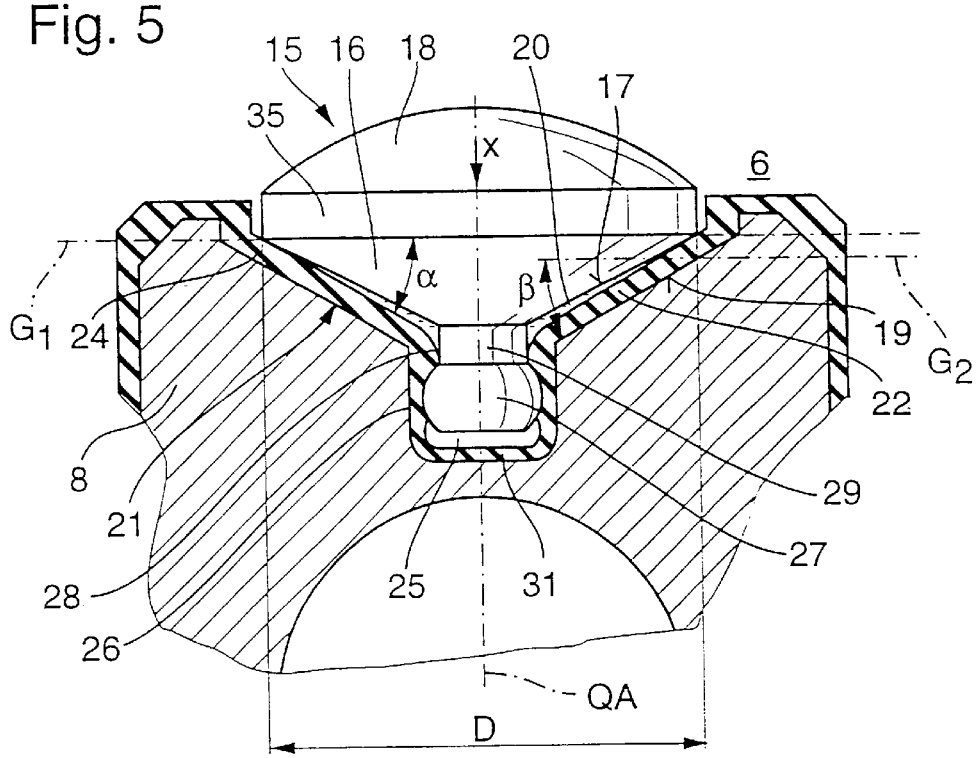
FIG. 5 is a section view along line V—V in FIG. 4.

FIG. 5 shows a representation of the section along the line V—V in FIG. 4. In this case, however, the displacement element 15 is shown in the position which corresponds to a maximum loading in the direction of the vibration amplitude X. The displacement element 15 has in this case been pushed into the hollow 21 in such a way that the outer peripheral edge rests on the elastomer coating 22 and consequently closes the annular gap 24, so that the displacement chamber 20 is only in communication with the chamber 6 via the radial clearances 23 shown in FIG. 4.

As also becomes clear from FIG. 5, in the depression 25 the elastomer coating 22 merges with an elastomer layer 26, which covers both the cylindrical portion of the depression 25 and the bottom 31. Only the channels 30, already mentioned in FIG. 4, on the wall of the depression 25 connect the volume beneath the continuation 27 to the displacement chamber 20. Level with the radial groove 29 in the continuation 27, the elastomer layer 26 has a radially inwardly directed bead 28, which engages in the groove 29. The effective displacement surface by which a damping force is produced in the displacement chamber 20 corresponds to the circular surface of the displacement element determined by the diameter D of the cylindrical portion 35 of the displacement element 15.

In the exemplary embodiment of FIG. 5, the conical lateral surface 17 is arranged at an angle $\alpha$, of 28° for example, with respect to a straight line $G_1$ running orthogonally with respect to the transverse axis QA. The conical surface 19 of the hollow 21 runs at an angle $\beta$, of 30° for example, with respect to a straight line $G_2$ running orthogonally with respect to the transverse axis QA, so that the displacement chamber 20 has towards the centre an increasing distance between the surfaces 17 and 19. This ensures that the displacement element is at the smallest distance from the elastomer coating 22 at the outer peripheral edge and consequently comes into contact first there. If the amplitude acts further in the direction of the arrow X, this has the consequence that the peripheral edge of the displacement element 15 presses into the elastomer coating 22 and the volume of the displacement chamber 20 is further reduced, the corresponding retroactive force increasing progressively, because the fluid can be displaced out of the displacement chamber 20 only through the radial clearances 23 into the chamber 6.

Figure 6:
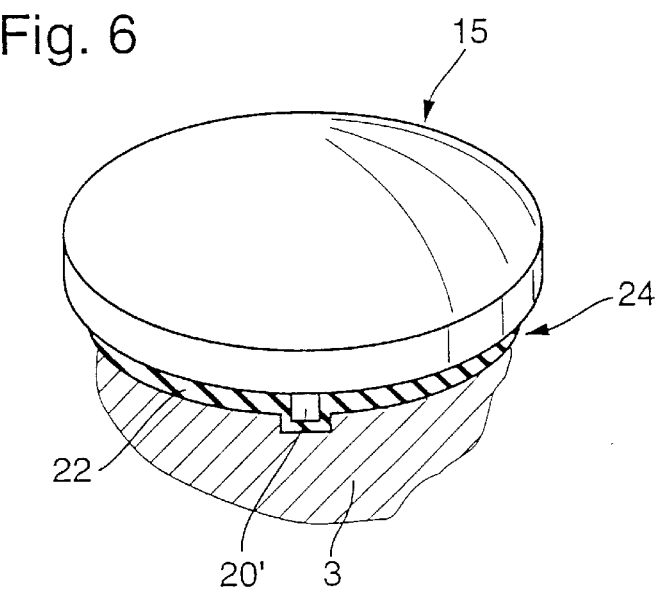
FIG. 6 is a perspective view in the direction of the arrow VI in FIG. 4.

FIG. 6 shows a view of the displacement element 15 in the direction of the arrow VI of FIG. 4. It is clear from this that the conduit 20' has only a limited cross section.

Figure 7:
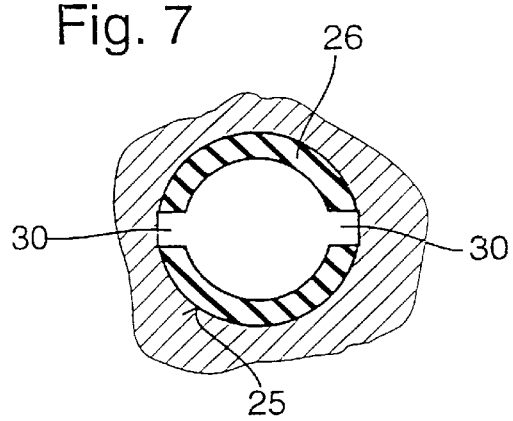
FIG. 7 is a section view along line VII—VII in FIG. 4.

FIG. 7 shows a section along the line VII—VII in FIG. 4. In the depression 25, the cylindrical wall is covered by the elastomer layer 26, only two diametric channels 30 being provided, which channels extend in the axial direction of the depression 25, as can be seen from FIG. 4.

The elastomer bearing 1 represented in the drawing and described above offers a frequency-selective hydraulic damping. Vibrations of small vibration amplitude are damped by the bearing core 3 being displaced radially in relation to the bearing sleeve 2, whereby one of the chambers 6 or 7 is reduced in terms of its volume and the other chamber, respectively, increases in volume to the same extent. According to the pressure gradient produced as a result, a vibration damping takes place by the throttled equalization of the difference in pressure via the throttling channel 50. If the difference in pressure exceeds a certain value in cases of greater amplitudes, the relevant non-return valve 11 or 11' is opened by the sealing lip 12 or 12' lifting off from the inside wall 14 of the bearing sleeve 2, so that more hydraulic fluid can flow from the chamber under pressure to the other chamber, respectively. On account of the throttling effect, the pressure produced by the vibration amplitude counteracts with a damping effect the force introduced.

The elastomer bearing 1 performs this function when vibration amplitudes up to a certain magnitude occur. If the vibration amplitude exceeds a certain magnitude, due to which the spherical segment 18 of the displacement element 15 comes into bearing contact with its reference surface, namely the inside wall 14 of the bearing sleeve 2, the displacement element 15 is moved with its truncated cone 16 further into the hollow 21, so that a force is exerted on the fluid in the displacement chamber 20 and consequently the pressure in the displacement chamber 20 increases. Since this pressure can be reduced only gradually through the annular gap 24, a progressively increasing damping, which becomes constantly greater with increasing reduction of the annular gap 24, is obtained. If the displacement element 15 makes contact with its peripheral edge on the elastomer coating 22, the pressure in the displacement chamber 20, which is higher than in the chamber 6, can be reduced only through the radial clearances 23.

When the vibration amplitude decays, an external force acts on the displacement element 15, so that the latter can again assume its original position. For this purpose, the fluid flows through the radial clearances 23, or the annular gap 24, out of the chamber 6 back into the displacement chamber 20. In order that the displacement element 15 is kept in a defined starting position, in which the displacement chamber 20 has a predetermined volume and also a corresponding distance between the surfaces 17 and 19, the bead 28 of the elastomer layer 36 engages in the groove 29 on the continuation 27, whereby the axial movement of the displacement element 15 is limited.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Hydraulically damping elastomer bearing, comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice.

2. Hydraulically damping elastomer bearing comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice, wherein the displacement element is arranged on the bearing core, and the reference surface is formed on the inside wall of the bearing sleeve.

3. Elastomer bearing according to claim 2, wherein two displacement elements lie on a common transverse axis of the bearing core and are arranged diametrically opposite each other.

4. Hydraulically damping elastomer bearing comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice, wherein a hollow with a conical surface is provided on the bearing core, in which a conical lateral surface of the displacement element is located, and the displacement chamber is formed between the respective surfaces.

5. Elastomer bearing according to claim 4, wherein the conical surface of the hollow and the conical lateral surface of the displacement element have different angles with respect to a plane orthogonal to an axis of symmetry, the angle of the conical surface of the hollow being greater than the angle of the conical lateral surface of the displacement element.

6. Elastomer bearing according to claim 5, wherein the angle of the conical surface is <40° and preferably about 30°.

7. Elastomer bearing according to claim 5, wherein the difference between the angles of the conical surface and the conical lateral surface is between 1° and 5° and preferably about 2°.

8. Elastomer bearing according to claim 4, wherein an annular gap is formed between the upper edge of the hollow and the outer periphery of the displacement element as a throttling orifice between the displacement chamber and one of the first chambers.

9. Elastomer bearing according to claim 4, wherein at the upper edge of the hollow at least one radial clearance is provided through which the displacement chamber is in communication with one of the first chambers.

10. Elastomer bearing according to claim 9, wherein two radial clearances are arranged diametrically to form throttling orifices with the annular gap closed.

11. Elastomer bearing according to claim 4, wherein the distance between the displacement surfaces is dimensioned such that the maximum travel of the displacement element is about 1 mm.

12. Elastomer bearing according to claim 4, wherein a cylindrical depression with an elastomer layer provided at least partially on a cylinder wall thereof is arranged centrally in the hollow.

13. Elastomer bearing according to claim 12, wherein a rotationally symmetrical continuation protrudes into the depression and is moulded onto the displacement element.

14. Elastomer bearing according to claim 13, wherein the elastomer layer has a radially inwardly directed bead configured to engage in a radial groove in the continuation.

15. Elastomer bearing according to claim 12, wherein at least one channel is arranged in the elastomer layer extending along the cylinder wall and extends approximately from the bottom of the depression into the displacement chamber.

16. Elastomer bearing according to claim 4, wherein the region of the displacement element located outside the hollow is a spherical segment with a radius being approximately 0.6 times an inside radius of the sleeve.

17. Elastomer bearing according to claim 4, wherein the bearing core is a sleeve, on the lateral surface of which portions of greater wall thickness are formed, in which the hollow is respectively arranged.

18. Elastomer bearing according to claim 4, wherein two diametrically running channels extend over the outer peripheral edge of the conical lateral surface and are arranged on the conical surface.

19. Hydraulically damping elastomer bearing comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice, wherein an elastomeric layer is arranged between the displacement element and the component bearing the displacement element.

20. Elastomer bearing according to claim 19, wherein the surface of the displacement chamber lying opposite the displacement element is formed on an elastomer coating.

21. Hydraulically damping elastomer bearing comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice, wherein a displacement area acted upon is >200 mm$^2$ and preferably between 300 mm$^2$ and 500 mm$^2$.

22. Hydraulically damping elastomer bearing comprising an outer bearing sleeve; an elastomer element operatively arranged in the bearing sleeve; a bearing core which is operatively held by the elastomer element; and extends substantially axially parallel or coaxially through the bearing sleeve; first chambers formed between the bearing core and the bearing sleeve and filled with fluid; a displacement element arranged in at least one of the chambers between the bearing core and the inside wall of the bearing sleeve is substantially inflexible, is held hydraulically supported by one of the components which are relatively movable in the unloaded state of the elastomer bearing, is at a predetermined distance from a reference surface on the other of the movable components, and if a loading predetermined by the distance is exceeded, comes into bearing contact with its reference surface; and a displacement chamber which is formed between the displacement element and the component bearing the latter and has a small height between the displacement surfaces and is in communication with one of the further chambers via at least one throttling orifice, wherein at least one throttling channel fluidically communicates with the first chambers.

23. Elastomer bearing according to claim 22, wherein two bypass channels are provided between the chambers, and a non-return valve, which opens at a certain positive pressure, is arranged in each channel, with the non-return valves opening in different directions of flow.

24. Elastomer bearing according to claim 23, wherein the non-return valves are formed by sealing lips of the elastomer element bearing against the inside wall of the bearing sleeve.

* * * * *